J. McFETRIDGE.
PROCESS OF TREATING WASTE FERROUS SULFATE LIQUORS.
APPLICATION FILED DEC. 11, 1909.
1,045,723.
Patented Nov. 26, 1912.
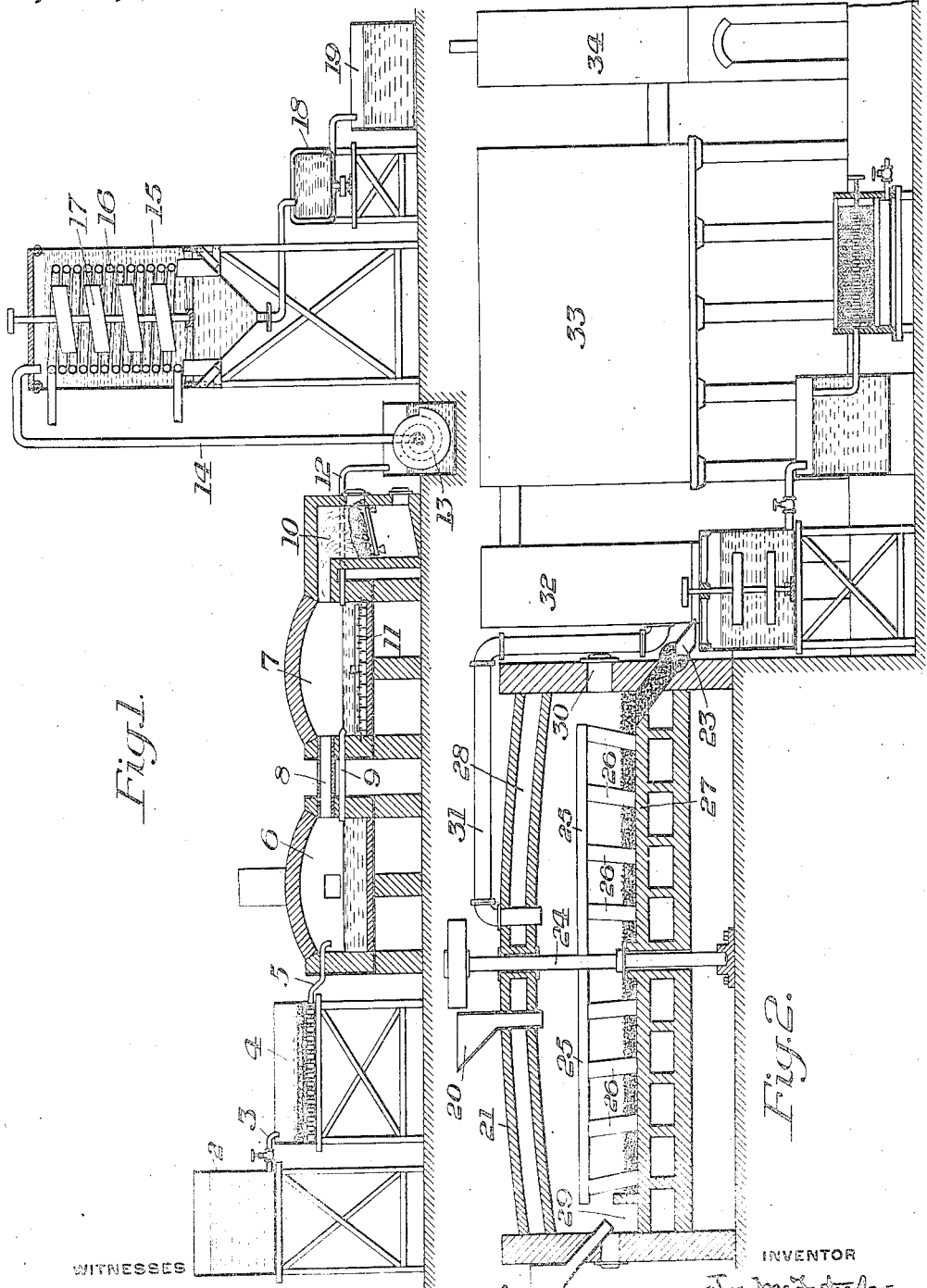

UNITED STATES PATENT OFFICE.

JOSEPH McFETRIDGE, OF VANDERGRIFT, PENNSYLVANIA, ASSIGNOR TO AMERICAN SHEET & TIN PLATE COMPANY, OF PITTSBURGH, PENNSYLVANIA, A CORPORATION OF NEW JERSEY.

PROCESS OF TREATING WASTE FERROUS SULFATE LIQUORS.

1,045,723.   Specification of Letters Patent.   Patented Nov. 26, 1912.

Application filed December 11, 1909. Serial No. 532,655.

*To all whom it may concern:*

Be it known that I, JOSEPH McFETRIDGE, of Vandergrift, Westmoreland county, Pennsylvania, have invented a new and useful Process of Treating Waste Ferrous Sulfate Liquors, of which the following is a full, clear, and exact description, reference being had to the accompanying drawings, forming part of this specification, in which—

Figures 1 and 2 are sectional elevations, partially diagrammatic, of portions of the apparatus which may be used in carrying out my invention.

My invention relates to a novel method for treating waste ferrous sulfate liquors for the purpose of obtaining therefrom commercial sulfuric acid, rouge or pigment and ferric sulfate. In methods of utilizing these waste liquors, as generally conducted heretofore, the free acid is neutralized with iron, the liquors concentrated, and crystals of commercial copperas produced by cooling the liquors. In other methods the copperas has been dried to expel the water of crystallization, and subjected to heat to form oxid of iron and sulfurous or sulfuric anhydrid.

According to the prior methods, where the aim has been to recover sulfur compounds and to produce a commercial pigment, a given quantity of copperas has been furnaced and heat maintained until practically all of the sulfur compounds were driven out, when the charge, as a whole, was removed from the furnace, and a fresh charge added. This method of procedure gave varying shades of color to the pigment, and the evolution of gases being intermittent, caused the portion of the sulfur eliminated as sulfurous anhydrid difficult, if not impossible, to reclaim at all.

The object of my invention is to recover as rouge or pigment and ferric sulfate the iron values contained in the waste by a continuous process in the form of rouge or pigment and ferric sulfate, while the free or uncombined sulfuric acid, together with the sulfuric anhydrid and the sulfurous anhydrid liberated by the decomposition of the ferrous sulfate, are all recovered as a solution of sulfuric acid.

Some of the distinguishing features of my invention are the saving of iron necessary to neutralize the free acid and retaining and reclaiming the same in a free or uncombined state; also the saving of labor and fuel necessary in the drying and grinding of the copperas preparatory to furnacing; also the saving of heat lost in cooling the liquors to the crystallizing point. In accordance with my invention, I add carbon to the ferrous sulfate while furnacing to cause decomposition at a lower temperature. I also generate heat for the decomposition of the ferrous sulfate by burning brimstone, bisulfid ore or matte in a specially constructed furnace. I also largely eliminate the dust in the furnacing operation and reclaim from twenty to twenty-five per cent. of the free acid in a form available for pickling iron or steel.

I will now describe in detail the preferred method of carrying out my invention. The waste liquors are stored in any suitable tank, such as indicated at 2 in Fig. 1. They are conveyed from this tank through a pipe 3 to a filter 4, of any suitable character. The clear liquor from this filter is conveyed through a lead pipe 5 into a top-fired evaporator 6, which may be constructed of wood or lead, brick-lined, and arched over with fire brick. The liquors are here concentrated to from thirty to thirty-five degrees Baumé, or to near the saturation point, by the top heat escaping from a concentrator 7, through a flue 8. The liquors flow from the evaporator 6 into the concentrator 7, through a pipe 9. Heat is applied to the surface of the liquor in the concentrator 7 from a suitable furnace 10. By applying heat to the surface, the liquor is concentrated and ferrous sulfate separates out. I term this salt ferrous liquor salt, since it contains less water of crystallization than commercial ferrous sulfate, usually termed "copperas." As no direct heat strikes the sides or bottom of the concentrator, the ferrous liquor salt does not adhere thereto, but coarse salt drops to the bottom and is removed by means of a suitable mechanical rake 11, while the fine ferrous liquor salt is held in suspension in the saturated solution which is drawn off through a pipe 12, into a spiral pump 13, and is thence discharged by a pipe 14, into a cooling agitator 15. This agitator may be constructed of wood, lead-lined, and contains a cooling coil 16. In this vessel, the fine ferrous liquor salt is collected, the individual particles being surrounded by fine crystals of ferrous sulfate which form by the cooling of the solution.

17 is a rotary agitator, contained in the vessel 15, for the purpose of keeping the liquor in agitation. The fine ferrous liquor salts and crystals of ferrous sulfate are separated from the highly acid solution by the centrifugal separator 18. The clear solution from the separator 18 contains from eight to ten per cent. of free acid and is stored in a suitable lead-lined tank 19, being available for pickling iron and steel and for stripping galvanized sheets, or for other purposes. A fresh supply of liquor is continually running into the evaporator 6, and concentrator 7, so that the evaporation, the separation of ferrous liquor salt and crystallization of ferrous sulfate and the recovery of the free acid is continuous.

The ferrous liquor salt produced in the concentrator 7 and removed by the rake 11, together with the ferrous salt collected in the centrifugal filter 18, is conveyed by suitable means to the hopper 20 of a muffle furnace 21. This furnace may be of any well known type of single hearth mechanical furnace with certain modifications. The furnace can be fired above or below or both above and below. In the furnace shown, 22 is a hopper or receptacle for brimstone, bisulfid ore or matte, and 23 is a roll-sealed discharge.

24 designates a central rotary shaft having the stirring arms 25, and rabble blades 26. 27 is the roasting hearth.

The furnace is fired underneath the hearth 27 and between the double arch 28 to a dull red heat. Sulfur, bisulfid ore or matte is fed from the hopper 22 into a receptacle 29, and air is admitted in regulated quantities through suitable doors, dampers or slides 30. The free sulfur, or the sulfur of the bisulfid ore or matte at once combine with the oxygen of the air to form sulfurous anhydrid. If free sulfur is used, it completely disappears by its conversion into sulfurous anhydrid, but if bisulfid ore or matte is employed, the residue remaining from its oxidation may be removed from time to time through the openings controlled by the slides 30. The heat evolved in the combustion of the sulfur assists in maintaining the heat of the furnace and is utilized to decompose the ferrous liquor salt and ferrous sulfate crystals produced in the concentrator 7 and in the centrifugal filter 18, these being fed to the furnace through the hopper 20. On entering the furnace, the ferrous salts are mixed with from one-half to one per cent. of carbon in a fine state of division for the purpose of assisting the decomposition of the ferrous sulfate which, in the presence of carbon, is broken up at a lower temperature.

The mixture of ferrous sulfate and carbon being conveyed to the furnace near the center is conveyed by the rabble blades 26 in a spiral course from the center toward the periphery of the furnace. By the admission of air in regulated quantities and maintaining the temperature from one thousand to thirteen hundred degrees F., the ferrous sulfate is decomposed, liberating sulfuric and sulfurous anhydrid, and the iron is converted to ferric oxid and is discharged through the roll-sealed discharge opening 23. This roll-sealed discharge opening is for the purpose of preventing air from being admitted at this point, thus preventing dust being carried back into the furnace and on through with the gases to the chambers and towers, to which the gases are subsequently conducted. The carbon acts as a reducing agent, causing rapid decomposition of the salt and reducing equivalent quantities of the sulfuric anhydrid to sulfurous anhydrid.

The mixture of sulfur compound (consisting chiefly of sulfurous anhydrid with sulfuric anhydrid present as an impurity) produced by the decomposition of the iron salt, together with the sulfurous anhydrid produced by the combustion of the sulfur contained in the brimstone, bisulfid ore or matte and the carbon dioxid produced by oxidation of the carbon with air in regulated quantities are drawn off through an exit pipe 31, to a set of lead chambers, consisting of a well known Glover tower 32, reaction chamber 33 and Guy-Lussac towers 34, where the sulfuric anhydrid is absorbed in strong sulfuric acid and the sulfurous anhydrid in converted into an aqueous solution of sulfuric acid by mixing it with water vapors and niter compounds in the well known chamber process.

By employing continuous feed and discharge, the furnace has at all times material in different stages of decomposition, ranging from fresh ferrous sulfate to the finished product, and the gases liberated are of uniform value and percentage, which is very essential in the chamber process. The oxid of iron being in a fine state of division and in contact with the sulfurous vapors at all times present in the furnace, acts as a catalytic agent, and from six to eight per cent. of sulfuric anhydrid is fixed at the temperature above stated and is removed with the oxid of iron through the roll-sealed discharge 23, and is reclaimed as ferric sulfate. This mixture of ferric sulfate and oxid of iron is digested with water in a suitable tank and is then separated by decantation in a suitable vessel from which it is passed through a filter. The ferric sulfate being soluble is recovered in the liquid form and is of commercial value as a pickle for iron and steel and copper-nickel alloys. The rogue or pigment is of uniform color and of well known value.

I do not intend to limit myself to the exact method of treatment which I have herein described, since many modifications thereof, without materially affecting the value of the method, will be apparent to chemists and others skilled in the art. Nor do I wish to limit myself to the use of apparatus such as shown in the drawings, and which is illustrative only, as suitable apparatus of different character in some respects may be employed.

I claim:

1. In the art of treating waste ferrous sulfate liquors, the method which consists in filtering said liquors, evaporating and thereby separating out the ferrous liquor salt therefrom, mixing the ferrous salt with carbon, furnacing the mixture of ferrous salt and carbon at a dull red heat, and burning sulfur-containing material in the furnace, whereby the heat evolved from the burning sulfur is utilized to maintain the heat in the furnace and the ferrous salt is decomposed, substantially as described.

2. In the art of treating waste ferrous sulfate liquors, the method which consists in evaporating and thereby separating out the ferrous sulfate salts, treating the ferrous sulfate salts by mixing the same with a relatively small percentage of carbon, introducing said mixture into a furnace, supplying a sulfur-bearing material to the furnace, and admitting air in regulated quantities to thereby oxidize the sulfur of said sulfur-bearing material and convert the ferrous sulfate into oxid of iron, whereby sulfurous anhydrid and sulfuric anhydrid are liberated, substantially as described.

3. In the art of treating waste ferrous sulfate liquors, the method which consists in evaporating said liquors and thereby separating out the ferrous liquor salt, mixing said salt with from one-half to one per cent. of fine carbon, heating the mixture to a dull red in a furnace, burning sulfur-bearing material in said furnace, whereby the heat from the combustion of the sulfur is utilized to decompose the ferrous sulfate and liberate sulfurous and sulfuric anhydrids and to form oxid of iron, thereby bringing the gases into contact with said oxid of iron and converting a portion of the sulfurous anhydrid to sulfuric anhydrid, a portion of said sulfuric anhydrid becoming fixed with oxid of iron to form ferric sulfate, adding liquid to the mixture, and then decanting said liquid, whereby the ferric sulfate is removed in solution and the oxid of iron is recovered as rouge or pigment, substantially as described.

In testimony whereof, I have hereunto set my hand.

JOSEPH McFETRIDGE.

Witnesses:
R. D. LITTLE,
H. M. CORWIN.